United States Patent
Stuler et al.

(10) Patent No.: US 9,520,795 B2
(45) Date of Patent: Dec. 13, 2016

(54) METHOD OF FORMING A POWER SUPPLY CONTROLLER AND STRUCTURE THEREFOR

(71) Applicant: Semiconductor Components Industries, LLC, Phoenix, AZ (US)

(72) Inventors: Roman Stuler, Karolinka (CZ); Vaclav Drda, Valasska Bystrice (CZ)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 194 days.

(21) Appl. No.: 14/149,997

(22) Filed: Jan. 8, 2014

(65) Prior Publication Data
US 2015/0194896 A1 Jul. 9, 2015

(51) Int. Cl.
*H02M 3/335* (2006.01)
*H02M 1/00* (2006.01)

(52) U.S. Cl.
CPC ..... *H02M 3/33523* (2013.01); *H02M 3/33569* (2013.01); *H02M 2001/0022* (2013.01); *H02M 2001/0058* (2013.01); *Y02B 70/1491* (2013.01)

(58) Field of Classification Search
CPC ............... H02M 2001/0022; H02M 3/335; H02M 3/33523; H02M 3/33569
See application file for complete search history.

(56) References Cited

U.S. PATENT DOCUMENTS

| | | | |
|---|---|---|---|
| 8,085,558 B2 | 12/2011 | Choi | |
| 8,085,559 B1 | 12/2011 | Choi | |
| 8,331,113 B2* | 12/2012 | Tang | H02M 1/425 323/266 |
| 2012/0069605 A1* | 3/2012 | Choi | H02M 3/337 363/21.02 |
| 2012/0127761 A1* | 5/2012 | Halberstadt | H02M 3/337 363/21.02 |
| 2014/0103896 A1* | 4/2014 | Lee | H02M 3/158 323/282 |

OTHER PUBLICATIONS

Jinhaeng Jang, Minjae Joung, Seokjae Choi, Youngho Choi, Byungcho Choi; Current Mode Control for LLC Series Resonant DC-to-DC Converters; 2011 IEEE.
Sanken Electric Co., Ltd.; Controller IC for Current Resonant Type Switching Power Supply with Half-Bridge Resonance, High Efficiency and Low Noise; Aug. 2010.
On Semiconductor; High Performance Resonant Mode Controller featuring High-Voltage Drivers; Semiconductor Components Industries, LLC; Nov. 2010—Rev. 7; NCP1396/D; http://onsemi.com.

* cited by examiner

*Primary Examiner* — Fred E Finch, III
*Assistant Examiner* — Rafael O De Leon Domenech
(74) *Attorney, Agent, or Firm* — Robert F. Hightower

(57) ABSTRACT

In one embodiment, a power supply controller may be configured to form a status signal that is representative of a secondary current by substantially removing a primary magnetization component from a primary current signal and to use the status signal to form a first signal that is representative of a delivered output power, and configured to adjust an on-time of one of a first or second switch responsively to the delivered output power.

20 Claims, 9 Drawing Sheets

METHOD OF FORMING A POWER SUPPLY CONTROLLER AND STRUCTURE THEREFOR

BACKGROUND

The present invention relates, in general, to electronics, and more particularly, to semiconductors, structures thereof, and methods of forming semiconductor devices.

In the past, various methods and structures were utilized to produce switching power supply converter systems that provided a regulated output voltage from an input voltage. In some applications, a resonant switching power supply converter was used because it could provide improved power conversion efficiency. Resonant power supply converters typically included a transformer with a tuned circuit that included a resonant capacitor. Some of the resonant power supply converters operated in a voltage control mode and some operated in a current control mode. It typically was advantageous for the resonant power supply converter to operate with a substantially fifty percent (50%) duty cycle. In some cases it was difficult to provide over-current or output power protection for the resonant power supply system. In some cases, the response time of the resonant converter system to a change in the input voltage may be slow.

Accordingly, it is desirable to have a resonant power supply converter that has efficient simpler and/or less expensive output power protection mechanism, and/or that has an improved response time to a change in the input voltage, and/or that may have a more symmetrical on-time and off-time.

Figure 1:
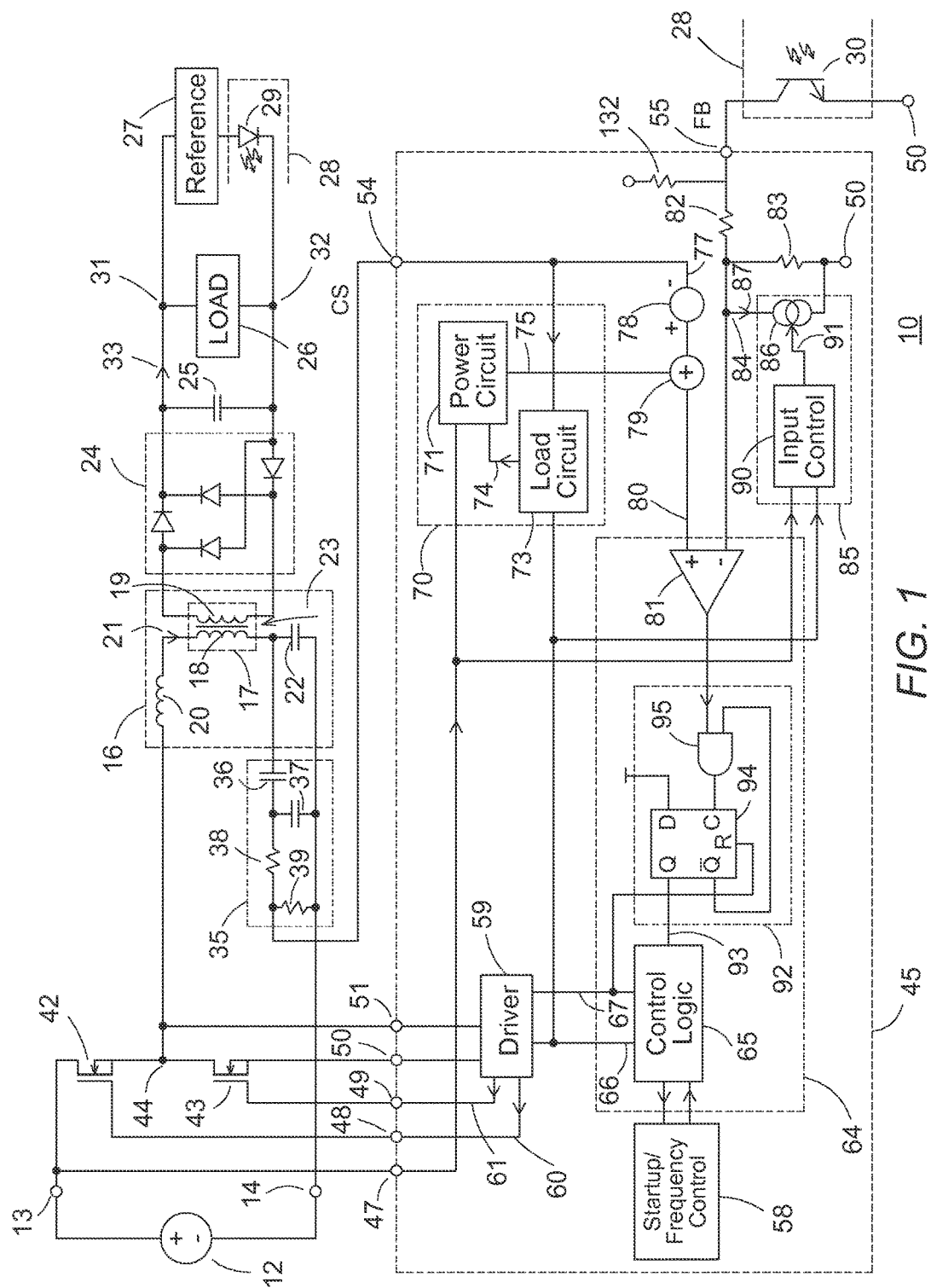
FIG. 1 schematically illustrates an example of a portion of an embodiment of a resonant power supply system that includes a resonant power supply controller in accordance with the present invention.

For simplicity and clarity of the illustration(s), elements in the figures are not necessarily to scale, some of the elements may be exaggerated for illustrative purposes, and the same reference numbers in different figures denote the same elements, unless stated otherwise. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, or certain N-type or P-type doped regions, a person of ordinary skill in the art will appreciate that complementary devices are also possible in accordance with the present invention. One of ordinary skill in the art understands that the conductivity type refers to the mechanism through which conduction occurs such as through conduction of holes or electrons, therefore, and that conductivity type does not refer to the doping concentration but the doping type, such as P-type or N-type. It will be appreciated by those skilled in the art that the words during, while, and when as used herein relating to circuit operation are not exact terms that mean an action takes place instantly upon an initiating action but that there may be some small but reasonable delay(s), such as various propagation delays, between the reaction that is initiated by the initial action. Additionally, the term while means that a certain action occurs at least within some portion of a duration of the initiating action. The use of the word approximately or substantially means that a value of an element has a parameter that is expected to be close to a stated value or position. However, as is well known in the art there are always minor variances that prevent the values or positions from being exactly as stated. It is well established in the art that variances of up to at least ten percent (10%) (and up to twenty percent (20%) for semiconductor doping concentrations) are reasonable variances from the ideal goal of exactly as described. When used in reference to a state of a signal, the term "asserted" means an active state of the signal and the term "negated" means an inactive state of the signal. The actual voltage value or logic state (such as a "1" or a "0") of the signal depends on whether positive or negative logic is used. Thus, asserted can be either a high voltage or a high logic or a low voltage or low logic depending on whether positive or negative logic is used and negated may be either a low voltage or low state or a high voltage or high logic depending on whether positive or negative logic is used. Herein, a positive logic convention is used, but those skilled in the art understand that a negative logic convention could also be used. The terms first, second, third and the like in the claims or/and in the Detailed Description of the Drawings, as used in a portion of a name of an element are used for distinguishing between similar elements and not necessarily for describing a sequence, either temporally, spatially, in ranking or in any other manner. It is to be understood that the terms so used are interchangeable under appropriate circumstances and that the embodiments described herein are capable of operation in other sequences than described or illustrated herein. For clarity of the drawings, doped regions of device structures are illustrated as having generally straight line edges and precise angular corners. However, those skilled in the art understand that due to the diffusion and activation of dopants the edges of doped regions generally may not be straight lines and the corners may not be precise angles.

DETAILED DESCRIPTION OF THE DRAWINGS

FIG. 1 schematically illustrates an example of a portion of an embodiment of a resonant power supply system 10 that has a less costly output power protection circuitry and that may have improved response to changes in the input voltage and that has more symmetrical on and off times. As will be seen further hereinafter, system 10 includes a power supply controller 45 that in one embodiment may be configured to compensate the on-time of a power switch for changes in the value of the input voltage. An embodiment of controller 45 may also include that controller 45 may be configured to compensate the on-time of the power switch for the value of the power delivered to a load.

System 10 typically receives an input voltage from a voltage source such as a voltage source 12 between an input terminal 13 and a common return terminal 14. Source 12 may provide a rectified DC voltage, such as a half-wave for full wave rectifier DC voltage, or other type of voltage as the input voltage. System 10 also includes a resonant circuit 16 that includes a resonant capacitor 22 and an inductor such as for example a primary inductor or winding 18 of a transformer 17. Transformer 17 typically also includes a secondary winding or inductor 19. An inductor 20 represents a leakage inductance resulting from the magnetic coupling between windings 18 and 19. Capacitor 22 typically is connected in series with winding 18. A secondary side of system 10 typically includes a rectifier 24 and a storage capacitor 25 that assist in forming an output voltage between a secondary voltage terminal 31 and a secondary common terminal 32. Those skilled in the art will appreciate that the secondary rectifier may have various other forms in other embodiments. A load 26 and a feedback network typically are also included in the secondary side of system 10. One example of the feedback network is illustrated which includes a reference 27 and an optical coupler 28 that are configured to form a feedback signal that is representative of the value of the output voltage. Reference 27 may be one of many different types of voltage references that are well-known to those skilled in the art and are used to create a reference voltage for controlling the value of the output voltage. For example, reference 27 may be an NCP431 or other equivalent type of reference circuit. Those skilled in the art will also appreciate that, as will be seen further hereinafter, the feedback circuit may have various other forms.

Typically, a power switch or pair of power switches may be in the primary side of system 10 and connected to circuit 16 to form a primary current 21 through inductor 18 in order to provide a secondary current or load current 33 to load 26 and provide power to load 26. The example illustrated in FIG. 1 utilizes a pair of power switches represented by a first transistor 42 and a second transistor 43 that are coupled to a switch node 44 in order to form primary current 21.

During the operation of system 10, primary current 21 flows through inductor 18 and forms a voltage 23, illustrated in a general manner by an arrow, across resonant capacitor 22. The instantaneous value of voltage 23 is representative of the value of primary current 21. Those skilled in the art will appreciate that the waveform of voltage 23 may be shifted from the waveform of current 21. A current sense network 35 may be configured to receive voltage 23 and form a current sense (CS) signal that is representative of the value of primary current 21. A capacitive divider may be connected in parallel with capacitor 22 in order to divide the value of voltage 23 to a value that is more suitable for use in with controller 45. The capacitive divider includes a capacitor 36 and a capacitor 37 that are connected in series with each other and the series combination thereof is connected in parallel with capacitor 22. Using a capacitive divider minimizes phase shift in the signal formed at the common node between capacitors 36 and 37, and may also reduce and preferably eliminate any DC offset from capacitor 22. An optional resistor divider, illustrated by optional resistor 38 and 39, may be utilized to further reduce the value of the signal formed at the common node between capacitors 36 and 37. Additionally, resistors 38 and 39 allow for scaling or changing the value of the CS signal. In some embodiments, the capacitive divider of capacitors 36 and 37 may be a portion of controller 45.

Controller 45 is configured to form at least one switching control signal in order to control transistors 42 and 43, thus current 21, and regulate the output voltage to substantially a target value. Those skilled in the art will appreciate that the output voltage is regulated to the target value within a range of values around the target value. For example, the target value may be five volts (5 V) and the range of values may be plus or minus five or ten percent (5-10%) around the five volts (5 V). As will be seen further hereinafter, controller 45 may be configured to use the feedback signal and optionally the CS signal to control the on-time of transistor 42 and to subsequently enable transistor 43 to have an on-time that is substantially equal to the on-time of transistor 42. Circuit 65 may be configured to determine the on-time used for transistor 42 and to form a substantially equal on-time for transistor 43.

Controller 45 includes an input 50 that is configured to receive the value of the voltage on common return terminal 14, an output 48 that is configured to provide a switching control signal 60 to operate transistor 42, an output 49 that is configured to provide a switching control signal 61 to operate transistor 43, an optional input 47 that is configured to receive the input voltage or a signal that is representative of the input voltage, and an optional input 51 that is configured to receive the signal formed at switch node 44. A current sense input 54 of controller 45 is configured to receive the current sense (CS) signal. A feedback input 55 of controller 45 is configured to receive the feedback (FB) signal that is representative of the value of the output voltage. In some embodiments, controller 45 may include an optional resistor 132 to assist in forming the FB signal. In another embodiment, controller 45 may also include an optional clamp circuit (not shown). One example embodiment of a clamp circuit is described in the description of FIG. 3 relating to an optional example clamp circuit 136.

Controller 45 usually includes a control circuit 64 that is configured to form at least one switching drive signal to control the operation of transistors 42 and 43. In one example embodiment, control circuit 64 may include a control logic circuit 65, a reset circuit 92, and a comparator 81. Circuit 92 may include a flip-flop 94 and an AND gate 95. In one embodiment, circuit 65 is configured to form a switching control signal 66 that is used to form signal 60 and a switching control signal 67 that is used to form signal 61. A driver circuit 59 of controller 45 may be configured to receive signals 66 and 67 and form respective signals 60 and 61 with sufficient drive to enable and disable transistors 42 and 43. Circuit 65 typically includes a non-overlap circuit that assists in forms signals 66 and 67 to substantially not be asserted at the same time in order to minimize, and preferably eliminate, the time that transistors 42 and 43 would be simultaneously enable. Such non-overlap circuits are well known to those skilled in the art. Controller 45 may also include an input compensation circuit 85, an optional power control circuit 70, and an optional startup and frequency control circuit 58 that may assist in initiating the formation of switching control signals such as during startup of system 10.

Figure 3:
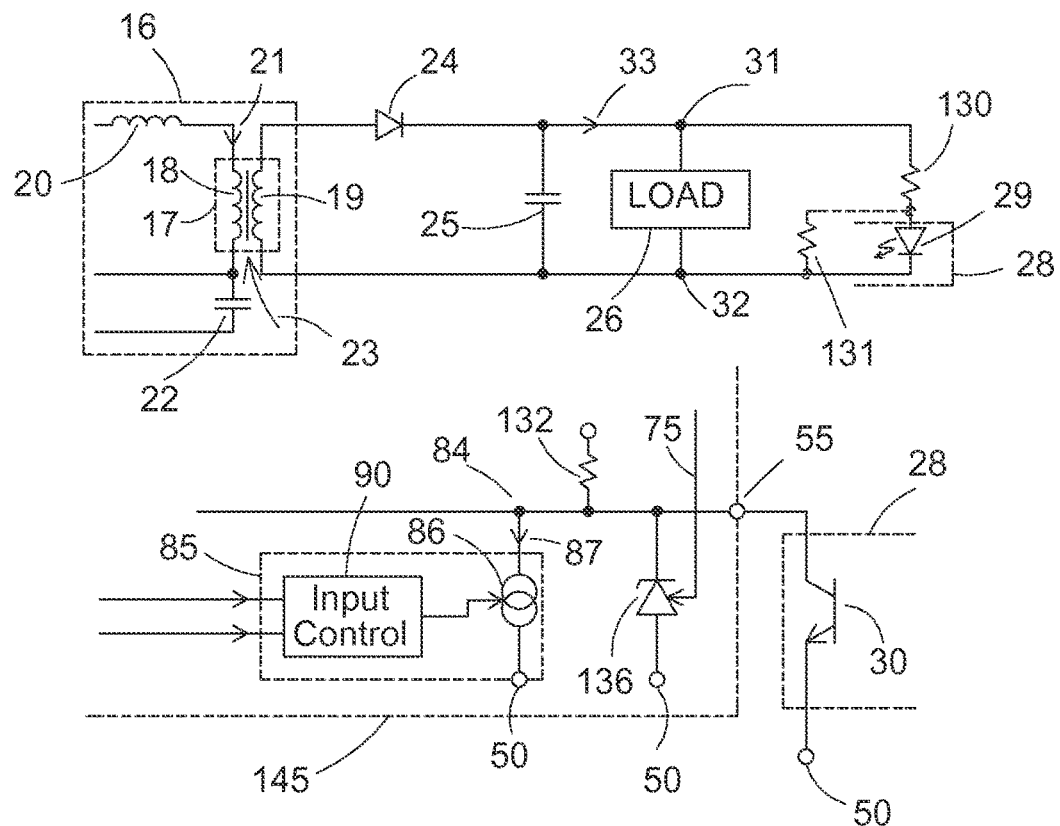
FIG. 3 schematically illustrates an example of a portion of an alternate embodiment of the controller of FIG. 1 in accordance with the present invention.
Figure 4:
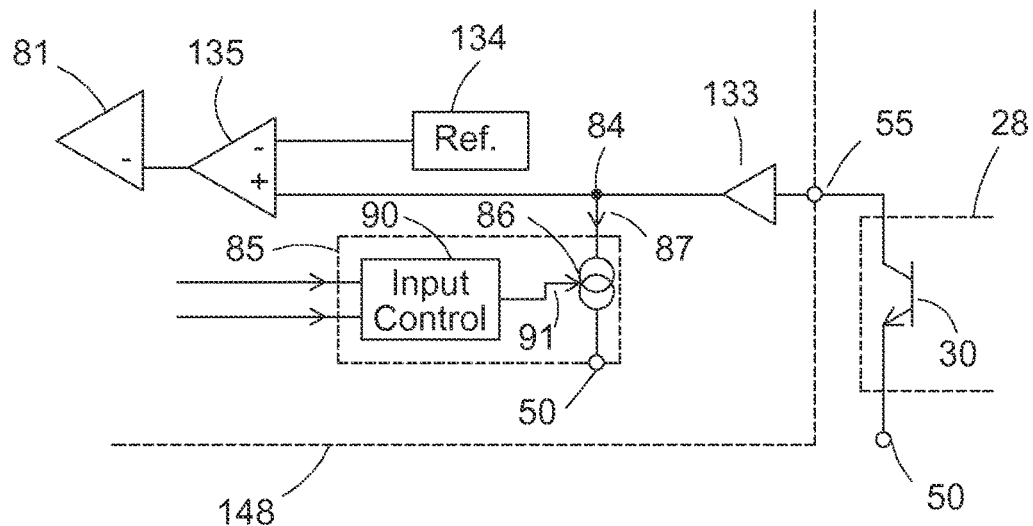
FIG. 4 schematically illustrates an example of a portion of a resonant power supply controller that is an alternate embodiment of the resonant power supply controller of FIG. 1 in accordance with the present invention.

As will be seen further hereinafter, input compensation circuit 85 may be configured to compensate the value of the feedback signal received on input 55 for variations in the input voltage formed on terminal 13. Controller 45 may in one embodiment include a feedback circuit formed by resistors 82 and 83 that reduces the value of the feedback signal to a value that is more easily used by the circuitry of controller 45. The feedback circuit of resistors 82 and 83 forms an another or second feedback signal at a node 84 that is representative of the feedback signal received on input 55. At least resistors 82 may also assist in buffering the feedback signal on input 55 from input compensation circuit 85. Other example embodiments of the feedback network of reference 27 and coupler 28, and of the feedback circuit of resistors 82 and 83 are illustrated in FIGS. 3-4. As will be understood by those skilled in the art, the second feedback signal at node 84 is also a feedback signal that is representative of the output voltage.

Figure 2:
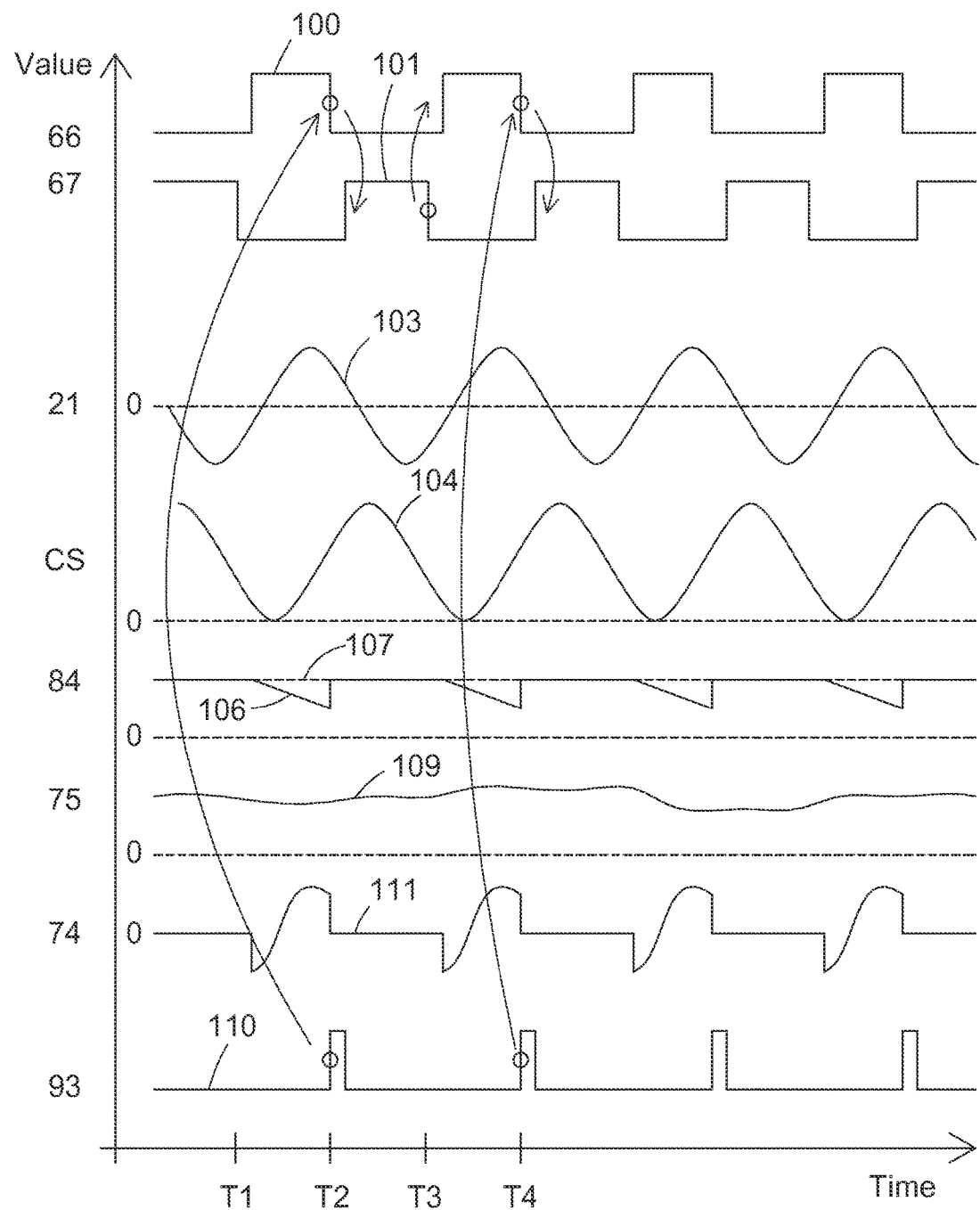
FIG. 2 is a graph having plots that illustrate some of the signals formed during the operation of the controller of FIG. 1 in accordance with the present invention.

FIG. 2 is a graph having plots that illustrate examples of some of the signals formed during the operation of system 10 and controller 45. The abscissa indicates time and the ordinate indicates increasing value of the illustrated signal. A plot 100 Illustrates switching control signal 66 and a plot 101 Illustrates switching control signal 67. A plot 103 illustrates primary current 21 and a plot 104 illustrates the CS signal received on input 54. A plot 106 illustrates a compensated value of the feedback signal formed at node 84 and a dashed plot 107 illustrates an example of the feedback signal without the compensation of circuit 85. A plot 111 illustrates a load status signal 74 and a plot 109 illustrates a power control signal 75 of circuit 70. A plot 110 illustrates a termination signal 93 formed by circuit 64. Load status signal 74, power control signal 75, and termination signal 93 will be explained further hereinafter. This description has references to FIG. 1 and FIG. 2.

In operation, assume that at just prior to a time T1 that signal 60 is negated in order to disable transistor 42 and signal 61 is asserted to enable transistor 43. In such a condition, current 21 typically would flow in a negative direction through transistor 43 as illustrated by plots 100, 101, and 103. Those skilled in the art will understand that the direction of current 21 usually changes such as during the on-time of the switch. Also assume that just before T1 signal 61 is negated to disable transistor 43, then at time T1 signal 60 is asserted to enable transistor 42 so that primary current 21 may be able to flow, for some portion of the ON-time, from input 13 through transistor 42 and winding 18 as illustrated by plots 100, 101, and 103. Assume for explanation purposes and simplification of the explanation, that the output voltage is substantially regulated and is not varying significantly as is illustrated by plot 107. Controller 45 is configured to receive the feedback signal and form the second feedback signal at node 84 that is representative of the feedback signal. If the value of the input voltage on input terminal 13 changes this could change the value of current 21 and may affect the amount of power delivered to load 26. Consequently, controller 45 includes a compensation circuit 85 which compensates the second feedback signal (or in an alternate embodiment the feedback signal) to adjust for the changes of the input voltage.

Circuit 85 includes an input control circuit 90 and also includes a variable current source 86 that may be configured to form a compensation current 87 that is used to adjust the value of the second feedback signal proportionally to the value of the input voltage on terminal 13. Circuit 90 receives the input voltage or a signal that is representative of the input voltage for example from a resistor divider (not shown) or other voltage reduction circuit, and forms a feedback control signal 91 having a value that is proportional to the input voltage. In the preferred embodiment, circuit 90 changes the value of control signal 91 only during the time that controller 45 forms a state of signal 60 which would enable transistor 42 because in some embodiments the input voltage typically affects the value of current 21 only when transistor 42 is enabled. Signal 91 is used to cause current source 86 to form current 87 at a value that is proportional to the input voltage. As the input voltage increases, the value of current 87 increases which decreases the value of the second feedback signal, as illustrated by plot 106, used to control the on-time of transistor 42. Control circuit 64 is configured to terminate the on-time of transistor 42 responsively to the value of the internal FB signal and the compensated CS signal being substantially equal. Thus, the decreased value of signal 84 between times T1 to T2 results in decreasing the on-time of signal 66, thus of transistor 42.

Because transistor 43 was enabled prior to time T1, current 21 previously was negative and becomes positive at or sometime after transistor 42 is enabled at time T1. Also, because voltage 23 across capacitor 22 is representative of the value of current 21, the value of the CS signal is decreasing prior to time T1. Although current 21 becomes positive at or sometime after time T1, the value of the CS sense signal may not begin increasing because current 21 has not been positive long enough to offset the negative value of current 21 prior to time T1.

In one embodiment, controller 45 may be configured to receive the CS signal and to form a compensated CS signal 80 that is compensated for the value of the input voltage and/or for the delivered output power such as for example the power delivered to terminals 31 and 32 including to load 26. Power control circuit 70 may be configured to form a power control signal 75 that has a value that is proportional to the input voltage and/or to the delivered output power. Load circuit 73 is configured to form a load control or load status signal 74 that is substantially representative of secondary current 33 for the on-time of transistor 42 as illustrated by plot 111. The current sense (CS) signal received by circuit 73 includes information about the primary magnetization current and also includes information about the secondary current that is reflected back into primary current 21. Circuit 73 is configured to substantially remove the primary magnetization current component from the current sense (CS) signal to obtain the secondary current information. This assists in more accurately determining the delivered output power. In one embodiment, circuit 73 utilizes the on-time of transistor 42 to assist in removing the primary magnetization current component from the current sense (CS) signal in order to obtain the secondary current information. The primary magnetization current information is substantially removed from the current sense (CS) signal to form signal 74. In one embodiment, circuit 73 is configured to use the value of primary current 21 during the time that transistor 42 is enabled, such as the time that signal 66 is asserted. The average value of current 21 during this time is representative of substantially the total value of current 21 minus the primary magnetization current which is representative of the value of secondary current 33. Those skilled in the art will understand that the primary magnetization component of current 21 may be substantially symmetrical around zero and may be reduced or substantially eliminated when current 21 is averaged and thus the effect of magnetization component of current 21 is minimized or has no substantial effect on the power calculation of circuit 70. This assists in providing a more accurate calculation of the delivered output power.

Power circuit 71 is configured to receive signal 74 and the signal that is representative of the input voltage and form power control signal 75 that is proportional to the input voltage and proportional to the delivered output power. In one embodiment, circuit 71 is configured to form the value of signal 75 as shown in the equation below:

$$V75 = A*Vin*B*LP$$

Where:
V75=the value of signal 75,
A=a proportionally constant for the input voltage,
B=a proportionally constant for the delivered output power,
Vin=the value of the input voltage, and
LP=the value of the delivered output power.

Controller 45 is configured to add the value of signal 75 to the current sense (CS) signal so that the current sense signal increases as either or both of the input voltage or the power delivered to load 26 increases. In one embodiment, controller 45 receives the CS signal and adds an optional offset signal 78 to the CS signal. The value of offset signal 78 may assist in minimizing the saturation of the feedback signal. After offset signal 78 is added, the resulting CS signal is added to signal 75, such as by a summing circuit 79 for example, to form compensated CS signal 80. Thus, if the input voltage or the power to load 26 increases (or alternately decreases), circuit 70 can cause the value of signal 80 to increase (or alternately decrease) which could increases (or alternately decrease) the on-time of transistor 42 (if signal 84 remains fixed).

Control circuit 64 is configured to terminate the on-time of transistor 42 responsively to the compensated value of the FB signal and the compensated CS signal being substantially equal. Comparator 81 of circuit 64 receives the compensated CS signal and the compensated value of the feedback signal and asserts the output of comparator 81 when the two signals are substantially equal. Asserting the output of comparator 81 clocks a high signal into a flip-flop 94 and asserts the Q output and termination signal 93. Circuit 92 resets signal 93, via flip-flop 94, responsively to asserting signal 93. Thus, signal 93 is only asserted for a time interval that is substantially the delay times of gate 95 and flip-flop 94. In other embodiments, signal 93 may be asserted for other time intervals. Typically, this is a few nano-seconds. Circuit 65 receives the asserted value of signal 93 and responsively negates signal 66 to disable transistor 42. Circuit 65 is configured to form the on-time of signal 67 and transistor 43 for substantially the same time interval (or interval of time) as was used for the on-time of transistor 42 that was just terminated. Thus, signal 93 typically is negated before transistor 43 is enabled. Since signal 93 is quickly negated, the values of the FB signal and the compensated value of the FB signal do not affect the value current 21 once signal 93 is negated.

Once the on-time of transistor 43 expires, circuit 65 again asserts signal 66 to enable transistor 42 as illustrated at a time T3. Transistor 42 remains enabled until the compensated value of the feedback signal and the compensated CS signal are again substantially equal as explained hereinbefore. those skilled in the art will appreciate that the illustrated portion of controller 45 including circuits 64, 70, and 90 are devoid of a circuit that integrates the value of the CS signal and devoid of a circuit that forms an integrated value over a time that switch 42 (or switch 43) is enabled and devoid of an integrator that integrates a signal that is indicative of current flow through one of transistors 42 or 43.

Plot 109 of FIG. 2 illustrates examples of the value of signal 75 changing as a result of changes in the input voltage or of the load power. For example, between times T3 and T4, plot 109 illustrates that the value of signal 75 may increase if the input voltage increases, and plot 109 also illustrates that the value of signal 75 may decrease if the power delivered to the load or if the value of the input voltage may decrease or if one decreases and the other increase but not increase sufficient to overcome the increase of the other signal.

FIG. 3 schematically illustrates an example of a portion of an alternate embodiment of the feedback network and a controller 145 that is an alternate embodiment of controller 45 described for FIGS. 1 and 2. Controller 145 is similar to controller 45 except that controller 145 includes an alternate embodiment of the feedback circuit within controller 45 and may also include an optional adjustable clamp circuit 136. The feedback network on the secondary side is modified to connect coupler 28 to receive the output voltage such as through a resistor 130 that may or may not be a part of an optional resistor divider that may include another resistor 131. Controller 145 may receive the feedback signal on input 55 and include a pull-up resistor 132. For such an embodiment, compensation circuit 85 may directly compensate the value of the signal received on input 55 to form the compensated value of the feedback signal.

Clamp circuit 136 is configured to clamp the value of the FB signal to a maximum value in order to limit the maximum power that can be delivered to load 26. Circuit 136 is configured to be enabled in response to the value of signal 75 having a value that is greater than a first value. The first value is determined by the value of signal 75 and changes proportionally to the value of signal 75. Those skilled in the art will appreciate that circuit 132 may optionally be used in controller 45 with or without using the optional feedback circuit illustrated in FIG. 3.

FIG. 4 schematically illustrates an example of a portion of a controller 148 that is an alternate embodiment of controller 45 described in the description of FIGS. 1 and 2 and of controller 145 explained in the description of FIG. 3. Controller 148 is similar to controller 145 except that controller 148 includes a buffer 133 and an error amplifier 135. Buffer 133 may receive the feedback signal from input 55 and buffer the second feedback signal from the feedback signal on input 55. Circuit 85 may form the compensated value of the feedback signal as described hereinbefore as explained hereinbefore in the description of FIG. 1 and controller 45. Compensation circuit 85 of controller 148 directly compensates the value of the signal received on input 55 to form the compensated value of the feedback signal. Error amplifier 135 receives the compensated value of the feedback signal and forms an error signal that is representative of the deviation of the value of the output voltage from a target value of the output voltage. Error amplifier 135 and reference voltage generator or Ref 134 function to replace Reference 27 that was described in the description of FIGS. 1 and 2. Those skilled in the art will understand that the output of amplifier 135 could be equivalent to the compensated value of the feedback signal applied to comparator 81 of controller 45.

Those skilled in the art will also appreciate that buffer 133 could be replaced by error amplifier 135 and Ref 134.

Figure 5:
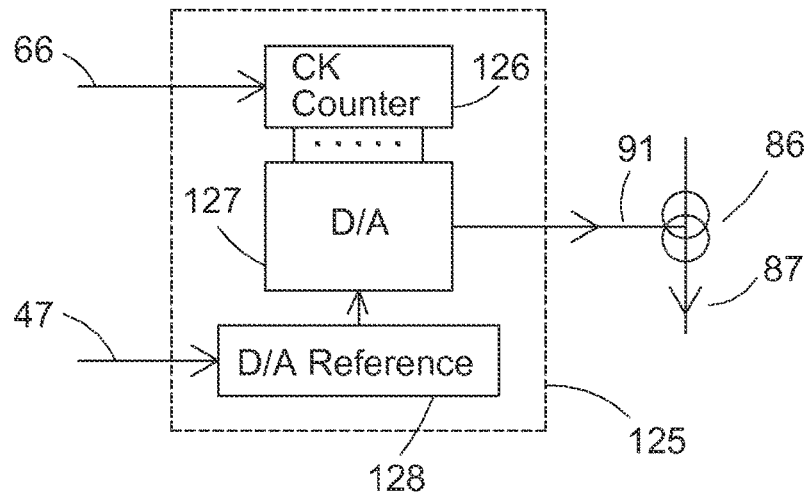
FIG. 5 schematically illustrates an example of a portion of an embodiment of an alternate embodiment of a circuit of the resonant power supply controller of FIG. 1 in accordance with the present invention.

FIG. 5 schematically illustrates an example of a portion of an embodiment of an input control circuit 125 that is an alternate embodiment of input control circuit 90 that was explained in the description of FIG. 1 and controller 45. In one embodiment, circuit 125 may include a counter 126 that determines the on-time of transistor 42, such as by determining the time that signal 66 is asserted. A D/A converter 127 may be used to convert that time to an analog signal that is representative of the on-time of transistor 42. A D/A reference circuit 128 can receive the value of the input voltage and form a reference signal for converter 127 that is representative of the value of the input voltage. As the input voltage changes, value of the reference signal from reference 128 changes and causes a corresponding change in the analog voltage of converter 127. For example, for a fixed value of the on-time of signal 66, the output of converter 127 may change proportionally to changes of the input voltage. Those skilled in the art will appreciate that the circuit illustrated in FIG. 5 is merely one example of a circuit that may be used for circuit 90 and that other circuits may be used instead of circuit 125.

Figure 6:
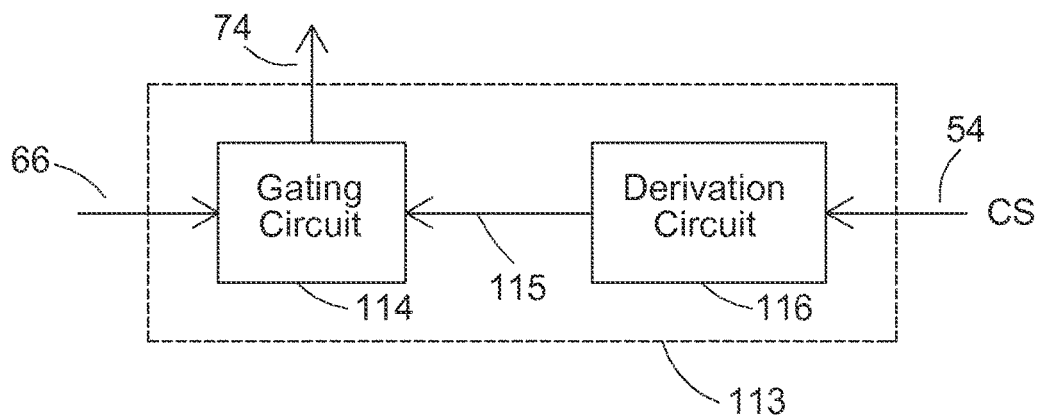
FIG. 6 schematically illustrates an example of a portion of an embodiment of an alternate embodiment of another circuit of the resonant power supply controller of FIG. 1 in accordance with the present invention.

FIG. 6 schematically illustrates an example of a portion of an embodiment of a load circuit 113 that is an alternate embodiment of load circuit 73 that was explained in the description of FIGS. 1 and 2. Circuit 113 includes a derivative circuit 116 that receives the CS signal and forms a signal 115 that is representative of the derivative of the CS signal. Since the CS signal is substantially a sinusoidal signal, signal 115 is also substantially a sinusoidal signal. A gating circuit or blanking circuit 114 receives signal 115 and signal 66 and forms signal 74. Gating or blanking circuit 114 cause signal 74 to be substantially zero when signal 66 is negated and forms signal 74 to be representative of signal 115 for the portion of signal 115 that signal 66 is asserted as illustrated by plot 111 in FIG. 2.

Figure 7:
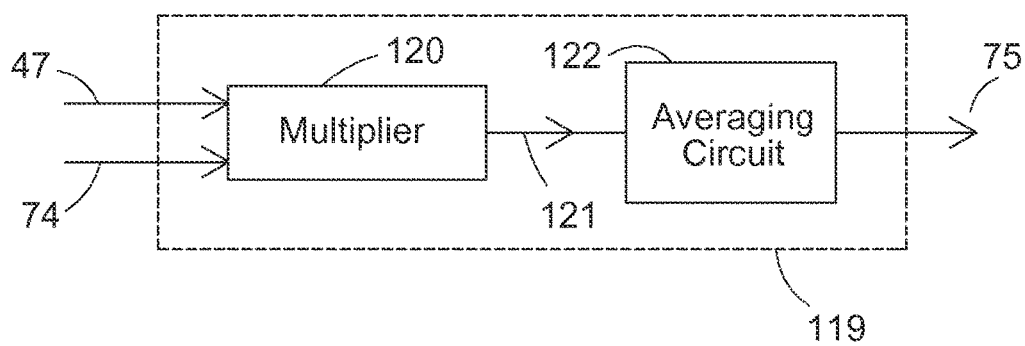
FIG. 7 schematically illustrates an example of a portion of an embodiment of an alternate embodiment of another circuit of the resonant power supply controller of FIG. 1 in accordance with the present invention.

FIG. 7 schematically illustrates an example of a portion of an embodiment of a power circuit 119 that is an alternate embodiment of power circuit 71 that is explained in the description of FIGS. 1 and 2. Circuit 119 includes a multiplier circuit or multiplier 120 that is configured to multiply signals 74 and 47 together to form a signal 121. In one embodiment, the output of circuit 120 may be representative of the input voltage such as if the load current is substantially constant. An averaging circuit 122 forms signal 75 as the average value of signal 121. Averaging the value of the primary current component of signal 121 minimizes or substantially removes the magnetization component of the primary current so that in one embodiment signal 75 is proportional to the delivered output power.

Those skilled in the art will appreciate that circuit 71 may have other alternate embodiments in addition to circuit 119, such as for example a gain controlled amplifier wherein the input information form signals 47 and 74 control the gain of the amplifier, thus, the value of signal 75.

Figure 8:
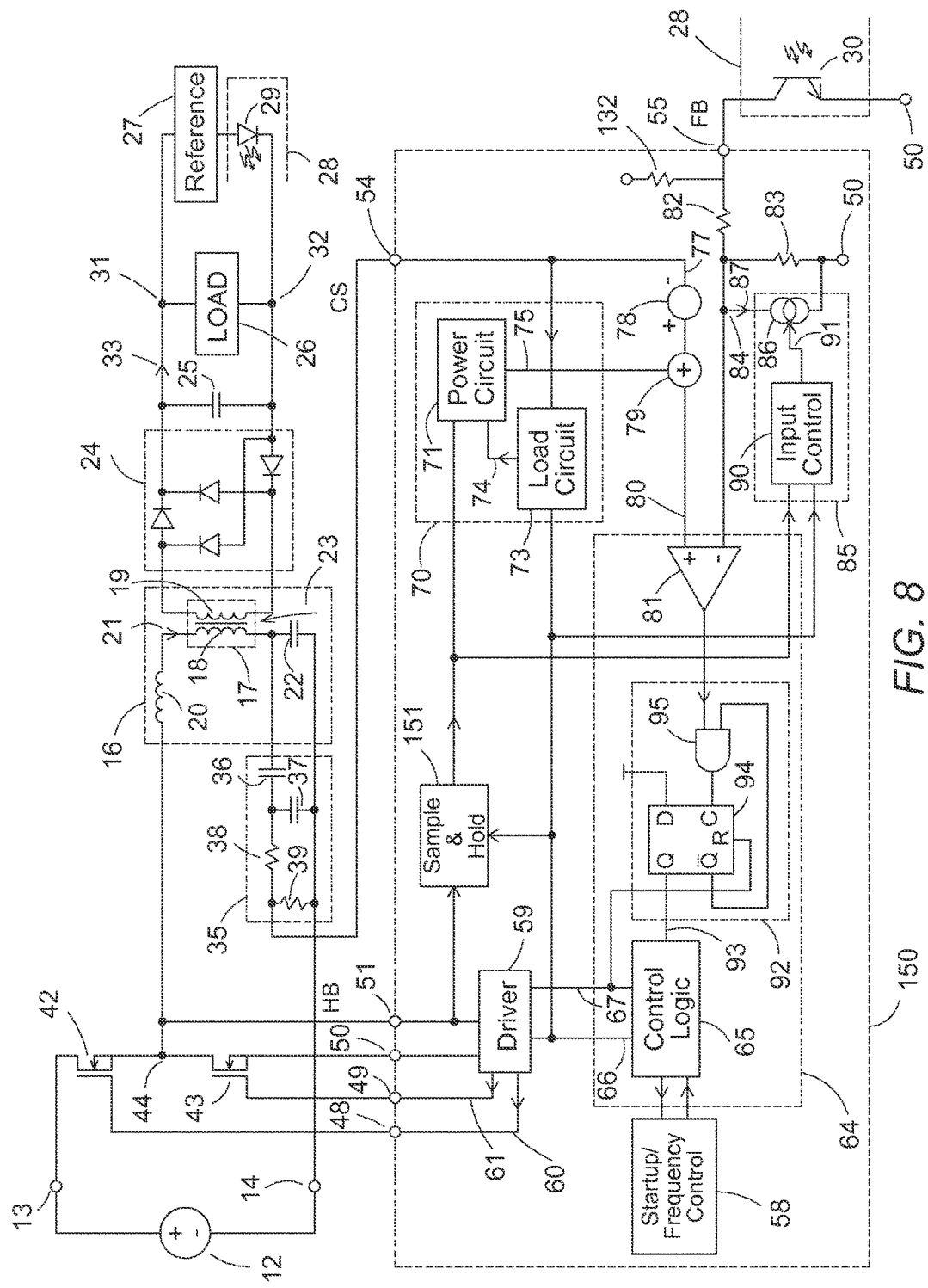
FIG. 8 schematically illustrates in an example of a portion of an embodiment of a resonant power supply system that includes an example of a portion of an embodiment of an alternate embodiment of the resonant power supply controller of FIG. 1 in accordance with the present invention.

FIG. 8 schematically illustrates in an example of a portion of an embodiment of a resonant power supply system that includes an example of a portion of an embodiment of a power supply controller 150 that is an alternate embodiment of controller 45 that was described in the description of FIGS. 1 and 2. Controller 150 is similar to controller 45 except that controller 150 includes a sample and hold circuit 151 but does not include input 47. Sample and hold circuit 151 is configured to sample a value of switch node 44 during at least a portion of the on-time of transistor 42. For example a portion of the time that signal 66 is asserted. When transistor 42 is enabled, the value of the voltage on node 44 is approximately equal to the input voltage on input 13. Thus, variations of the input voltage are reflected as variations in the value of the voltage on node 44. Thus, the voltage on node 44 can be used to compensate for variations in the value of the input voltage.

Circuit 151 is configured to sample the value of node 44 as received on input 51 either received directly or as a signal that is representative of node 44. Circuit 151 may sample the signal from input 51 during at least some portion of the time that either of signals 60 or 66 are asserted and then hold that value until the select portion of the asserted state of either of signals 60 or 66. For example, circuit 151 may delay a short time after the asserted edge of signal 66 and then sample node 44. The sampling may be negated either after a time interval or by a particular signal that ensures that the sampling is terminated prior to negating transistor 42. For example, the output of gate 95 may be used to terminate the sampling. The delays through flip-flop 94 and circuit 65 would provide assist in having transistor 42 disabled after the sampling is terminated.

One advantage is that controller 150 uses one less pin or terminal. Those skilled in the art will appreciate that one less pin on a semiconductor package can be an advantage.

Figure 9:
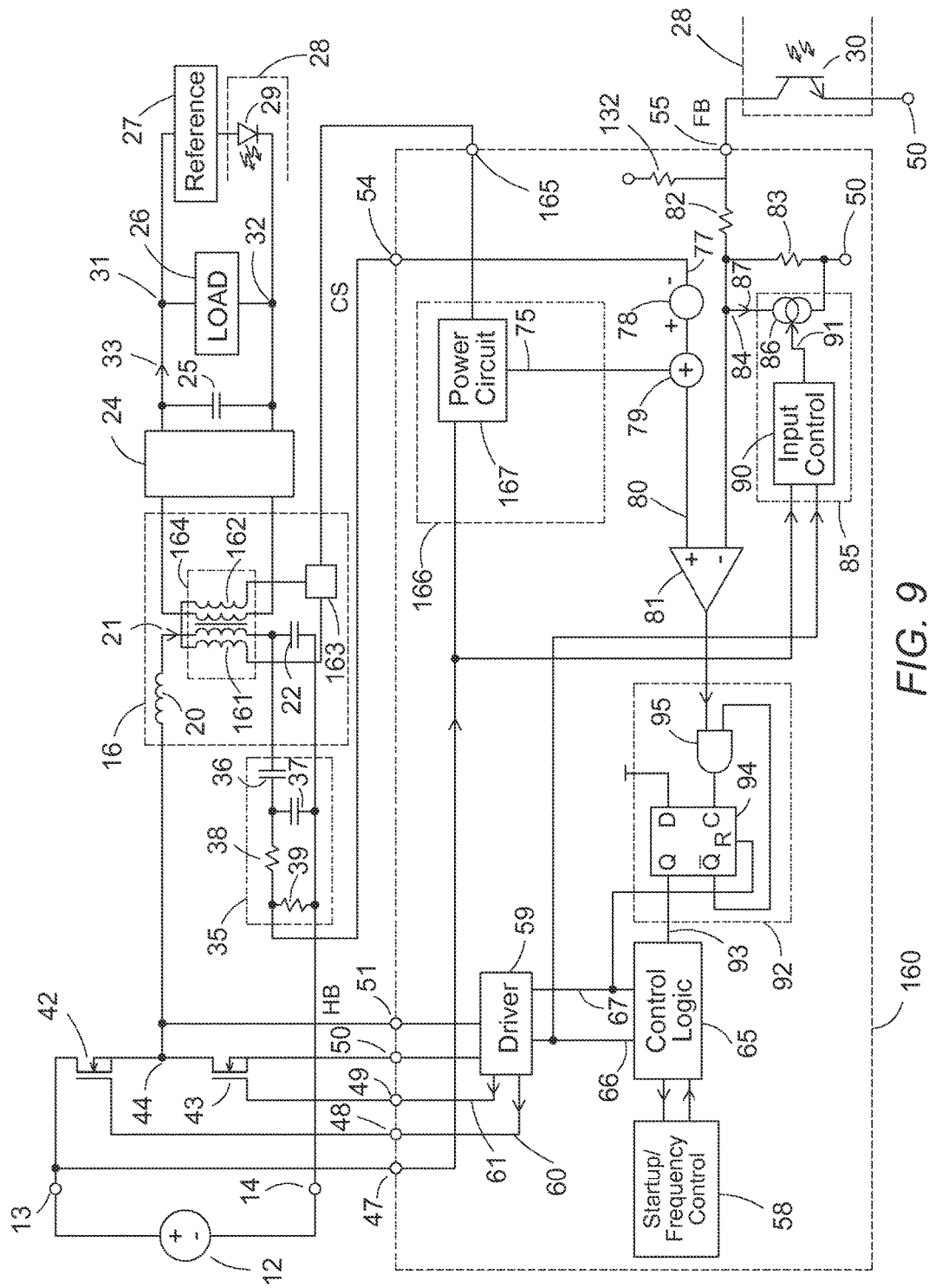
FIG. 9 schematically illustrates in an example of a portion of an embodiment of a resonant power supply system that includes an example of a portion of an embodiment of another alternate embodiment of the resonant power supply controller of FIG. 1 in accordance with the present invention.

FIG. 9 schematically illustrates an example of a portion of an embodiment of a resonant power supply system that includes an example of a portion of an embodiment of a power supply controller 160 that is an alternate embodiment of controller 45 that was described in the description of FIGS. 1 and 2 or of controller 150. Controller 160 is similar to controller 45 except that controller 160 includes an alternate power control circuit 166 that includes an alternate power circuit 167. A transformer 164 is similar to transformer 17 but is modified to have two auxiliary windings 161 and 162 and a rectifier 163. Winding 161 is magnetically coupled to winding 18 and winding 162 is magnetically coupled to winding 19 which assists in forms a more accurate representation of current 33. Rectifier 163 may be a full wave rectifier that receives the signals from winding 161 and 162 and forms a rectified signal that is proportional to load current 33. Controller 160 receives the signal that is representative of current 33 and uses that signal to form power control signal 75 that is representative of variations of the power delivered to the load instead of using signal 74 that was formed by circuit 73 of controller 45.

Figure 12:
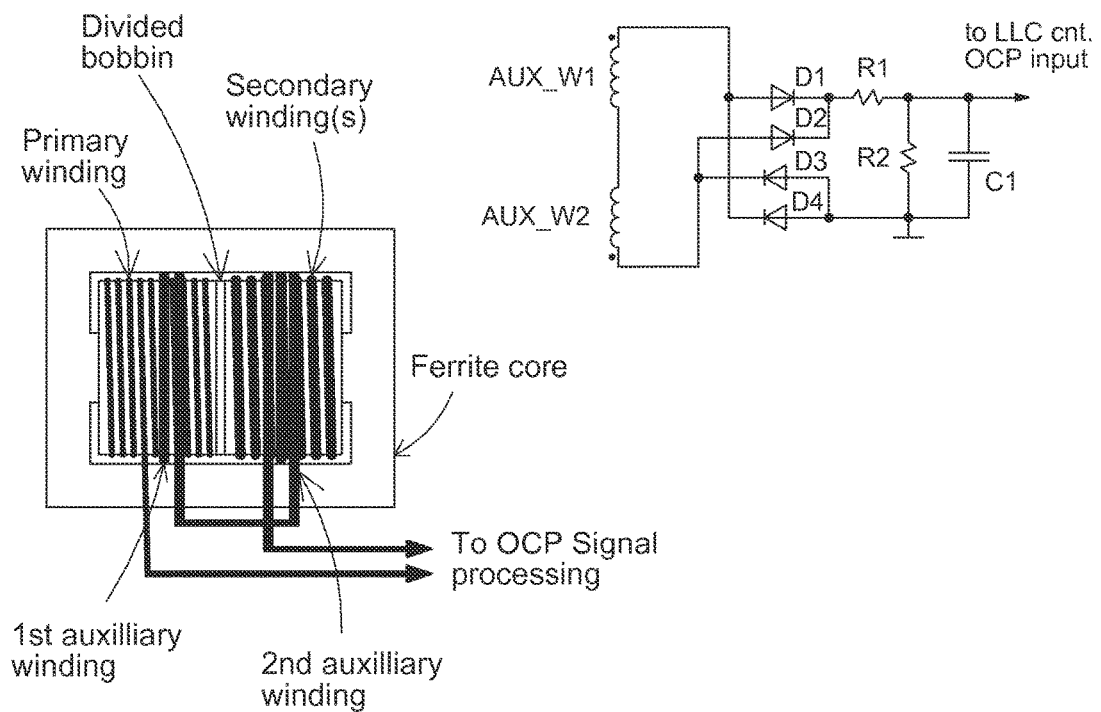
FIG. 12 illustrates an example of a portion of an embodiment of a transformer that may be used for the power supply system of FIG. 9 in accordance with the present invention.

One example of a transformer that may be used for transformer 164 is illustrated in FIG. 12. Another example may be found in U.S. Pat. No. 8,064,229.

Figure 10:
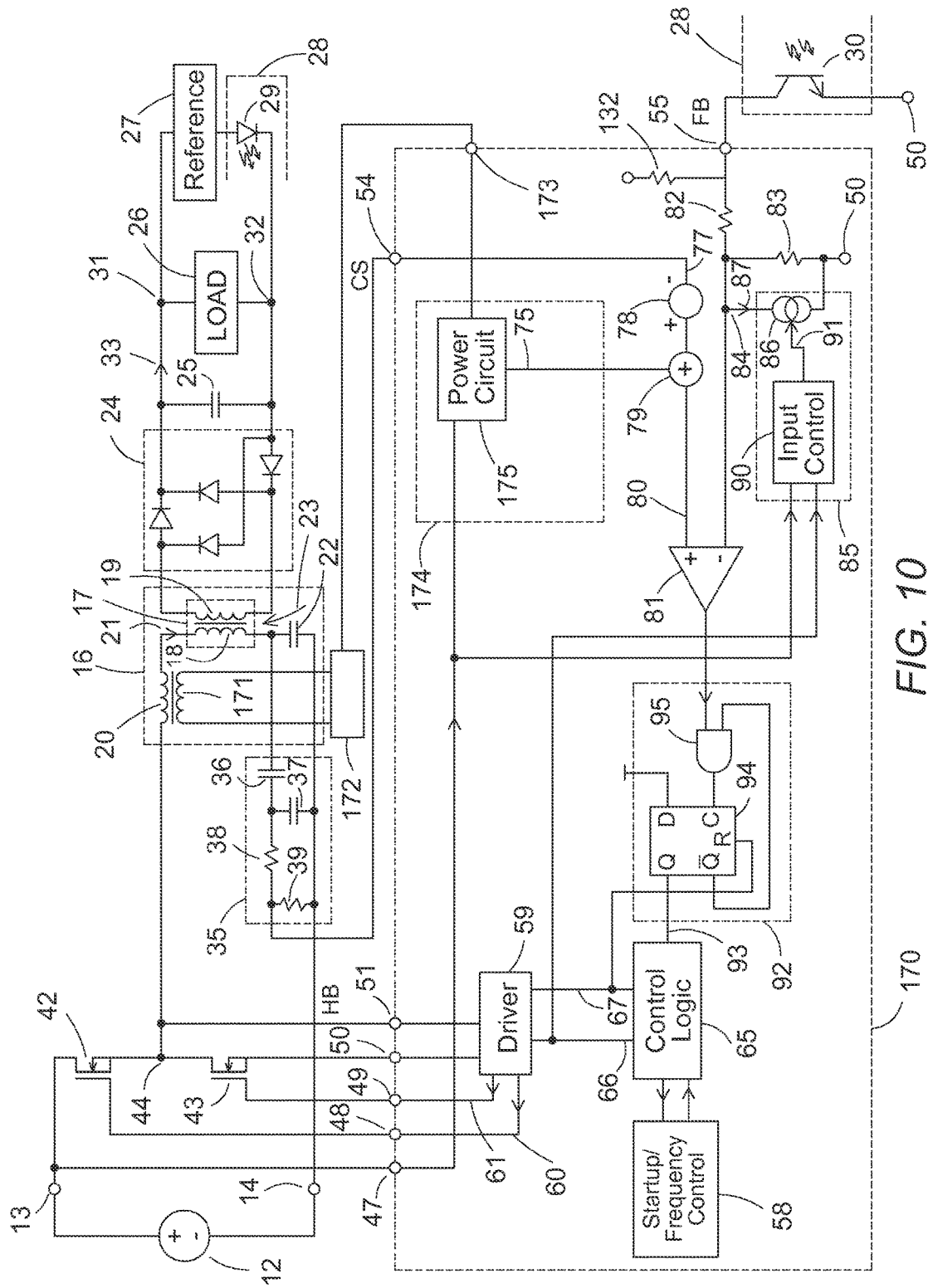
FIG. 10 schematically illustrates in an example of a portion of an embodiment of a resonant power supply system that includes an example of a portion of an embodiment of an alternate embodiment of the resonant power supply controller of FIG. 1 in accordance with the present invention.

FIG. 10 schematically illustrates an example of a portion of an embodiment of a resonant power supply system that includes an example of a portion of an embodiment of a power supply controller 170 that is an alternate embodiment of controller 45 that was described in the description of FIGS. 1 and 2 or of controllers 150 and/or 160. Controller 170 is similar to controller 45 except that controller 170 includes an alternate power control circuit 174 that includes an alternate power circuit 175 that are alternate embodiments of respective circuits 70 and 71. Resonant circuit 16 is modified to include a sense coil or sense inductor 171 that is used to sense current through a resonant inductor 20 of circuit 16. Inductor 171 forms a sense signal that is representative of primary current 21. A rectifier 172 may be a full wave rectifier that forms a rectified signal that is proportional to primary current 21. Controller 170 receives the signal that is representative of current 21 and uses that signal to form power control signal 75 that is representative of variations of the power delivered to the load instead of using signal 74 that was formed by circuit 73 of controller 45.

Figure 11:
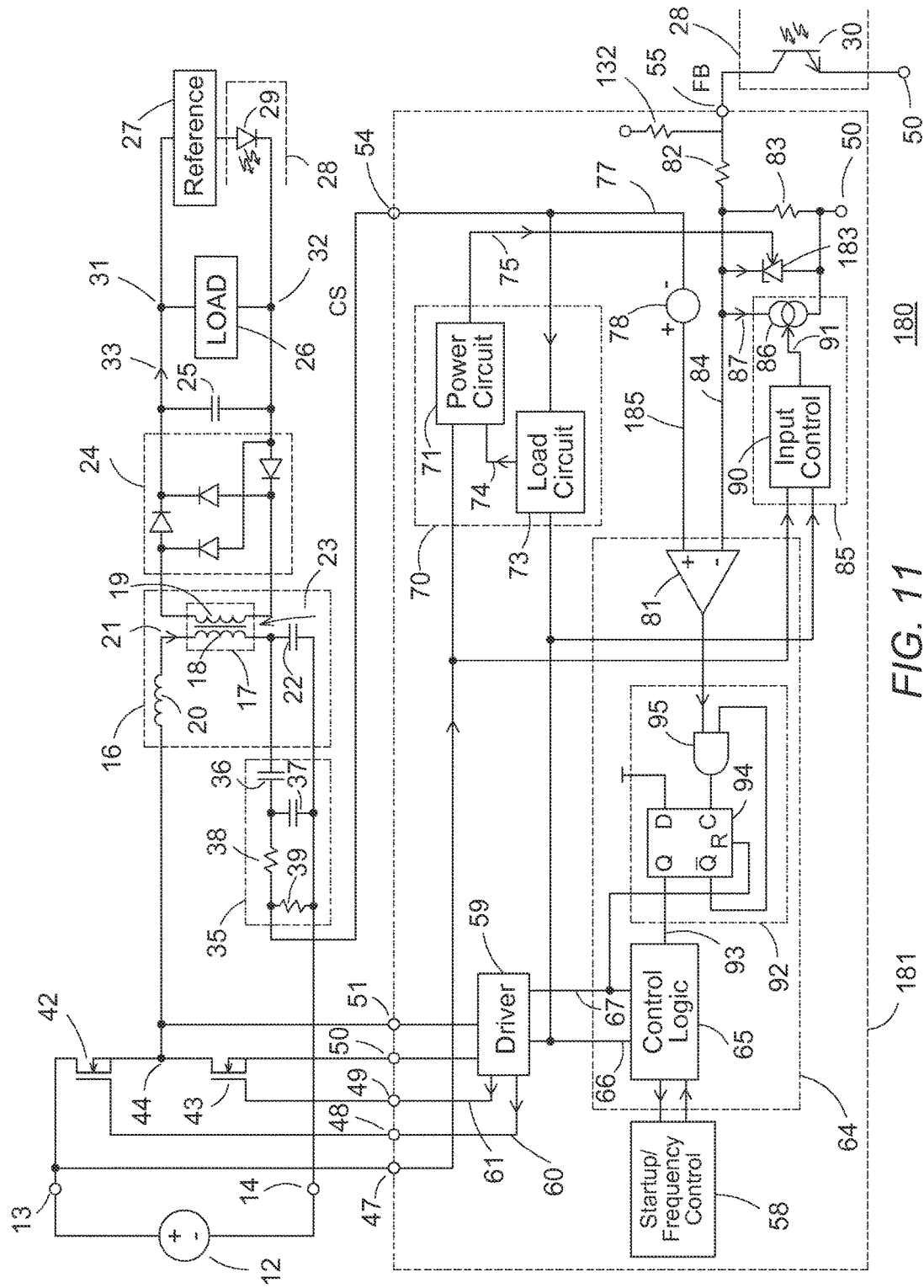
FIG. 11 schematically illustrates in an example of a portion of an embodiment of a resonant power supply system that includes an example of a portion of an alternate embodiment of the resonant power supply controller of FIG. 1 in accordance with the present invention.

FIG. 11 schematically illustrates an example of a portion of an embodiment of a resonant power supply system 180 that includes an example of a portion of an embodiment of a power supply controller 181 that is an alternate embodiment of controller 45 that was described in the description of FIGS. 1 and 2 or of any of controllers 145, 148, 150, 160, or 170. Controller 181 includes an adjustable clamp circuit 183. Circuit 183 may be similar to and operate similarly to circuit 136 (FIG. 3). Controller 181 does not include summing circuit 79 that was illustrated in FIG. 1. Controller 181 adjusts the clamp value of circuit 183 responsively to the value of signal 75 to form compensated feedback signal 84. Therefore, circuit 183 adjusts the maximum value of the compensated feedback signal 84 proportionally to the amount of delivered output power, such as responsively to the value of signal 75. In one embodiment, circuit 181 is configured to terminate an ON-time of transistor 42 responsively to the compensated feedback signal 84 approximately equaling the first signal. This allows accurately controlling the maximum value of the delivered output power.

FIG. 12 illustrates an example of a portion of an embodiment of a transformer that may be used for transformer 164 in FIG. 9. The auxiliary windings, such as for example windings 161 and 162, may have the same number of turns. A first auxiliary winding may be placed above the primary winding and second auxiliary winding is placed above the secondary(ies) winding(s). Both auxiliary windings are connected in series but with the contrary orientation. The output signal, provided by the windings in the connection, is proportional to the load current and the magnetizing current component of the primary current is well suppressed. This signal can be thus directly used for signal 165 described in the description of FIG. 9.

Figure 13:
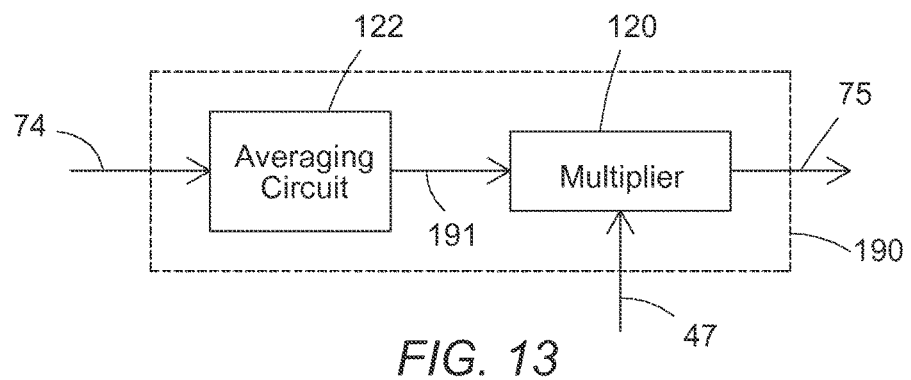
FIG. 13 schematically illustrates an example of a portion of an embodiment of an alternate embodiment of another circuit of the resonant power supply controller of FIG. 1 in accordance with the present invention.

FIG. 13 schematically illustrates an example of a portion of an embodiment of a power circuit 190 that is an alternate embodiment of power circuit 71 that is explained in the description of FIGS. 1 and 2 or an alternate of circuit 119 (FIG. 7). Circuit 190 may be configured to form an average value of signal 74 before using signal 74 to form signal 75. The averaging may be used to minimize or substantially remove the magnetizing current related component.

Those skilled in the art will appreciate that one embodiment of a power supply controller may comprise:

a control circuit (such as for example circuit 64) configured to form at least one switching control signal (for example one of signals 66 and/or 67) to control first and second switches (such as for example transistors 42/43) to form a primary current (such as current 21 for example) through a resonant circuit to regulate an output voltage (for example the output voltage at terminal 31) to a load from an input voltage (such as voltage from terminal 13) and form a load current (such as current 33 for example) for the load;

a first circuit (such as for example circuit 70) configured to receive a first signal (for example signal CS) that is representative of a value of the primary current and to receive a second signal (such as the signal on input 47 for example) that is representative of the input voltage and responsively form a control signal such as for example signal 75) having a value that is proportional to a delivered output power;

a feedback circuit configured to receive a signal that is representative of the output voltage and form a feedback signal (such as for example signal 77) that is representative of the output voltage;

a first compensation circuit (such as circuit 85 for example) configured to decrease a value of the feedback signal proportional to a value of the input voltage responsively to enabling the first switch (such as transistor 42 as a non-limiting example);

the power supply controller configured to adjust one of the first signal proportionally to the control signal to form a compensated current sense signal (such as for example signal 80) or to adjust the feedback signal proportionally to the control signal to form a compensated feedback signal; and the control circuit configured to terminate an ON-time of the first switch responsively to one of the compensated current sense signal approximately equaling the feedback signal or the compensated feedback signal approximately equaling the first signal.

In another embodiment, the power supply control circuit may include a variable current source configured to form a first current (87) having a value that decreases the value of the feedback signal proportionally to the value of the input voltage to adjust a value of the ON-time of the first switch.

In an embodiment, the first compensation circuit may include an input control circuit configured to form a control signal having a value that is proportional to the input voltage including forming the value of the control signal responsively to the control circuit forming a state to enable the first switch.

An embodiment may include that the input control circuit may be configured adjust the value of control signal of the input control circuit responsively to the control circuit forming the state to enable the first switch.

In one embodiment, the first compensation circuit may include a D/A converter that is configured to determine the on-time of the first switch in order to form the feedback control signal from the input voltage.

An embodiment may include that the first circuit may be configured to form the value of the control signal to be substantially proportional to the input voltage and substantially proportional to the delivered output power wherein the power supply controller adjusts a value of the compensated current sense signal by the value of the power control signal to adjust a duration of the ON-time of the first switch.

An embodiment of the power supply controller circuit may include that the first circuit has a load circuit (such as circuit 73 for example) configured to form a load status signal (such as for example signal 74) that is representative of the load current.

AN embodiment of the power supply controller circuit may include a power circuit (such as for example circuit 71) configured to receive the load status signal and a signal representative of the input voltage and form the control signal having a value that is proportional to the input voltage and to the delivered output power.

One embodiment may include that the control circuit is configured to form an ON-time of the second switch to be approximately equal to the ON-time of the first switch.

In an embodiment, the first circuit may include a load circuit (such as for example circuit 71) that is configured to form a load status signal (such as for example signal 74), the load circuit having a derivation circuit (for example circuit 116) that forms a derivative signal (for example signal 115) that is representative of a derivative of the first signal.

An embodiment may include a gating circuit that receives the derivative signal and receives a switching signal that is representative of the ON-time of the first switch, the gating circuit configured to couple the derivative signal to the load status signal responsively to an asserted state of the switching signal and to negate the load status signal responsively to a negated state of the switching signal.

Another embodiment may include a power circuit having a multiplier wherein the multiplier has a first input coupled to receive the load status signal and a second input coupled to receive the second signal, the multiplier configured to multiply the second signal by the load status signal and form the control signal as an average value of the resulting multiplicand.

Those skilled in the art will appreciate that a method of forming a power supply controller may comprise:

configuring the power supply controller to form at least one switching control signal to control first and second switches to form a primary current through a resonant circuit to regulate an output voltage (for example the voltage on terminal 31) to a load from an input voltage (such as the voltage from terminal 13 for example) and form a load current for the load;

configuring a first circuit (for example circuit 73) to receive a first signal (such as the CS signal for example) that is representative of the primary current and form a status signal (for example signal 74) that is representative of the load current;

configuring a second circuit (for example circuit 71) to receive the first signal, the status signal, and a signal representative of the input voltage and responsively form a control signal (such as signal 75 for example) having a value that is proportional to a delivered output power, wherein the power supply controller is configured to form a compensated current sense signal by adjusting the first signal proportionally to the control signal; and configuring the power supply controller to use the compensated current sense signal to adjust an on-time of the first switch.

An embodiment of the method may also include configuring the first circuit to substantially remove a primary magnetization component of the resonant circuit from the first signal.

An embodiment may further include configuring the first circuit to use the primary current during an on-time of the at least one switching control signal.

In an embodiment the method may further include configuring the first circuit and the second circuit to be devoid of an integrating circuit that integrates the first signal.

Those skilled in the art will appreciate that a method of forming a power supply controller may comprise:

configuring the power supply controller to form at least one switching control signal to control first and second switches to form a primary current through a resonant circuit to regulate an output voltage to a load from an input voltage and form a load current for the load;

configuring the power supply controller to form a status signal (for example signal 74) that is representative of the secondary current by substantially removing a primary magnetization component of the primary current;

configuring the power supply controller to use the status signal to form a first signal (for example signal 75) that is representative of a delivered output power; and configuring the power supply controller to adjust an on-time of one of the first or second switches responsively to the delivered output power.

AN embodiment of the method may include configuring the power supply controller to substantially remove the primary magnetization component.

One embodiment of the method may include configuring the power supply controller to use the status signal and a third signal that is representative of the input voltage to determine the delivered output power.

An embodiment may include configuring the power supply controller to multiply together the status signal and the third signal and form an average a value of the multiplicand.

In view of all of the above, it is evident that a novel device and method is disclosed. Included, among other features, is configuring the power supply controller to determine a value of the delivered output power using signals only on a primary side of the associated resonant circuit. Removing the primary magnetization component from the primary current provides a signal that is representative of the secondary current without having to sense a value of the secondary current. Adjusting the ON-time of the primary switches in response to changes in the input voltage assists in providing a faster response time but with simpler and lower cost circuitry.

While the subject matter of the descriptions are described with specific preferred embodiments and example embodiments, the foregoing drawings and descriptions thereof depict only typical and examples of embodiments of the subject matter and are not therefore to be considered to be limiting of its scope, it is evident that many alternatives and variations will be apparent to those skilled in the art.

As the claims hereinafter reflect, inventive aspects may lie in less than all features of a single foregoing disclosed embodiment. Thus, the hereinafter expressed claims are hereby expressly incorporated into this Detailed Description of the Drawings, with each claim standing on its own as a separate embodiment of an invention. Furthermore, while some embodiments described herein include some but not other features included in other embodiments, combinations of features of different embodiments are meant to be within the scope of the invention, and form different embodiments, as would be understood by those skilled in the art.

The invention claimed is:

1. A power supply controller comprising:
 a control circuit configured to form at least one switching control signal to control first and second switches to form a primary current through a resonant circuit to regulate an output voltage to a load from an input voltage and form a load current for the load wherein the first switch is enabled to supply current from the input voltage;

a first circuit configured to receive a first signal that is representative of a value of the primary current and to receive a second signal that is representative of a value of the input voltage and responsively form a control signal having a value that is proportional to a delivered output power;

a feedback circuit configured to receive a signal that is representative of the output voltage and form a feedback signal that is representative of the output voltage;

a first compensation circuit configured to form a third signal that is proportional to a value that the input voltage has during at least a portion of a time that the first switch is enabled and to use the third signal to decrease a value of the feedback signal proportional to the input voltage wherein the decrease is performed in response to enabling the first switch;

the power supply controller configured to adjust one of the first signal proportionally to the control signal to form a compensated current sense signal or to adjust the feedback signal proportionally to the control signal to form a compensated feedback signal; and the control circuit configured to terminate an ON-time of the first switch responsively to one of the compensated current sense signal approximately equaling the feedback signal or the compensated feedback signal approximately equaling the first signal.

2. The power supply controller circuit of claim 1 wherein the first compensation circuit includes a variable current source configured to form the third signal as a first current having a value that decreases the value of the feedback signal proportionally to the value of the input voltage to adjust a value of the ON-time of the first switch.

3. The power supply controller circuit of claim 2 wherein the first compensation circuit includes an input control circuit configured to form a control signal having a value that is proportional to the input voltage including forming the value of the control signal responsively only to the control circuit forming a state to enable the first switch.

4. The power supply controller circuit of claim 3 wherein the input control circuit is configured adjust the value of control signal of the input control circuit responsively to the control circuit forming the state to enable the first switch.

5. The power supply controller circuit of claim 2 wherein the first compensation circuit includes a D/A converter that is configured to determine the on-time of the first switch in order to form the feedback control signal from the input voltage.

6. The power supply controller circuit of claim 1 wherein the first circuit is configured to form the value of the control signal to be substantially proportional to the input voltage and substantially proportional to the delivered output power wherein the power supply controller adjusts a value of the compensated current sense signal by the value of the power control signal to adjust a duration of the ON-time of the first switch.

7. The power supply controller circuit of claim 6 wherein the first circuit includes a load circuit configured to form a load status signal that is representative of the load current.

8. The power supply controller circuit of claim 7 wherein the first circuit includes a power circuit configured to receive the load status signal and a signal representative of the input voltage and form the control signal having a value that is proportional to the input voltage and to the delivered output power.

9. The power supply controller circuit of claim 1 wherein the control circuit is configured to form an ON-time of the second switch to be approximately equal to the ON-time of the first switch.

10. The power supply controller circuit of claim 1 wherein the first compensation circuit is configured such that the third signal can change in response to changes of the input voltage during the portion of the time that the first switch is enabled.

11. A power supply controller comprising:

a control circuit configured to form at least one switching control signal to control first and second switches to form a primary current through a resonant circuit to regulate an output voltage to a load from an input voltage and form a load current for the load;

a first circuit configured to receive a first signal that is representative of a value of the primary current and to receive a second signal that is representative of the input voltage and responsively form a control signal having a value that is proportional to a delivered output power, the first circuit including a load circuit that is configured to form a load status signal, the load circuit having a derivation circuit that forms a derivative signal that is representative of a derivative of the first signal;

a feedback circuit configured to receive a signal that is representative of the output voltage and form a feedback signal that is representative of the output voltage;

a first compensation circuit configured to decrease a value of the feedback signal proportional to a value of the input voltage responsively to enabling the first switch;

the power supply controller configured to adjust one of the first signal proportionally to the control signal to form a compensated current sense signal or to adjust the feedback signal proportionally to the control signal to form a compensated feedback signal; and the control circuit configured to terminate an ON-time of the first switch responsively to one of the compensated current sense signal approximately equaling the feedback signal or the compensated feedback signal approximately equaling the first signal.

12. The power supply controller circuit of claim 11 wherein the load circuit also including a gating circuit that receives the derivative signal and receives a switching signal that is representative of the ON-time of the first switch, the gating circuit configured to couple the derivative signal to the load status signal responsively to an asserted state of the switching signal and to negate the load status signal responsively to a negated state of the switching signal.

13. The power supply controller circuit of claim 11 wherein the first circuit includes a power circuit having a multiplier wherein the multiplier has a first input coupled to receive the load status signal and a second input coupled to receive the second signal, the multiplier configured to multiply the second signal by the load status signal and form the control signal as an average value of the resulting multiplicand.

14. A method of forming a power supply controller comprising:

configuring the power supply controller to form at least one switching control signal to control first and second switches to form a primary current through a resonant circuit to regulate an output voltage to a load from an input voltage and form a load current for the load;

configuring the power supply controller to receive a feedback signal that is representative of the output voltage;

configuring a first circuit to receive a first signal that is representative of the primary current and form a status signal that is representative of the secondary current by substantially removing a primary magnetization component of the primary current, wherein the removing is performed only during an on-time of the first switch;

configuring a second circuit to receive the first signal, the status signal, and a signal representative of a value of the input voltage and responsively form a control signal having a value that is proportional to a delivered output power, wherein the power supply controller is configured to form a compensated current sense signal by adjusting the first signal proportionally to the control signal; and configuring the power supply controller to use the compensated current sense signal to adjust an on-time of the first switch.

15. The method of claim 14 wherein configuring the first circuit includes configuring the first circuit to substantially remove the primary magnetization component of the resonant circuit from the first signal.

16. The method of claim 15 further including configuring the first circuit to use the primary current during an on-time of the at least one switching control signal.

17. The method of claim 14 further including configuring the first circuit and the second circuit to be devoid of an integrating circuit that integrates the first signal.

18. A method of forming a power supply controller comprising:

configuring the power supply controller to form at least one switching control signal to control first and second switches to form a primary current through a resonant circuit to regulate an output voltage to a load from an input voltage and form a load current for the load;

configuring the power supply controller to form a signal that is representative of the output voltage;

configuring the power supply controller to form a status signal that is representative of the secondary current by substantially removing a primary magnetization component of the primary current, wherein the removing is performed only during an on-time of the first switch;

configuring the power supply controller to use the status signal to form a first signal that is representative of a delivered output power; and configuring the power supply controller to adjust an on-time of one of the first or second switches responsively to the delivered output power.

19. The method of claim 18 whereon configuring the power supply controller to use the status signal to form the first signal includes configuring the power supply controller to use the status signal and a third signal that is representative of the input voltage to determine the delivered output power.

20. The method of claim 18 further including configuring the power supply controller to multiply together the status signal and the third signal and form an average value of the multiplicand.

* * * * *